(12) United States Patent
Leadingham et al.

(10) Patent No.: US 9,356,399 B2
(45) Date of Patent: May 31, 2016

(54) AIRCRAFT GROUND POWER CONNECTOR

(71) Applicants: David Wayne Leadingham, Bradenton, FL (US); Drew Robert Johnson, Palmetto, FL (US); Randy John Fette, Santa Rosa, CA (US); Ralph Emerson Welch, Bradenton, FL (US)

(72) Inventors: David Wayne Leadingham, Bradenton, FL (US); Drew Robert Johnson, Palmetto, FL (US); Randy John Fette, Santa Rosa, CA (US); Ralph Emerson Welch, Bradenton, FL (US)

(73) Assignee: Illinois Tool Works, Inc., Glenview, IL (US)

( * ) Notice: Subject to any disclaimer, the term of this patent is extended or adjusted under 35 U.S.C. 154(b) by 46 days.

(21) Appl. No.: 14/105,485

(22) Filed: Dec. 13, 2013

(65) Prior Publication Data

US 2015/0171555 A1    Jun. 18, 2015

(51) Int. Cl.
| | |
|---|---|
| *H01R 13/66* | (2006.01) |
| *H01R 13/648* | (2006.01) |
| *B64F 1/36* | (2006.01) |
| *B64F 1/34* | (2006.01) |

(52) U.S. Cl.
CPC .............. *H01R 13/648* (2013.01); *B64F 1/34* (2013.01); *B64F 1/36* (2013.01)

(58) Field of Classification Search
CPC ........ H01B 9/00; H01R 3/00; H01R 2103/00; H02G 1/00; H02G 2200/00; H02M 1/00; H02J 1/00
USPC ............. 439/34, 310, 101, 108, 181, 620.01; 361/1–100; 320/109, 114
See application file for complete search history.

(56) References Cited

U.S. PATENT DOCUMENTS

| | | | |
|---|---|---|---|
| 4,758,175 A | 7/1988 | Didier et al. | |
| 5,256,081 A | 10/1993 | Didier | |
| 5,941,718 A | 8/1999 | Didier | |
| 6,832,925 B2 | 12/2004 | Draggie et al. | |
| 7,119,450 B2 * | 10/2006 | Albrecht ................... | B64F 1/34 290/1 A |
| 7,484,689 B2 | 2/2009 | Musial et al. | |
| 7,884,495 B2 * | 2/2011 | Kojori .............................. | 307/31 |
| 7,927,140 B2 * | 4/2011 | Beck ............................. | 439/606 |
| 8,840,405 B2 * | 9/2014 | Thomas .......................... | 439/35 |
| 2007/0054559 A1 * | 3/2007 | Thrap et al. .............. | 439/620.01 |

(Continued)

OTHER PUBLICATIONS

PCT/US2014/056123 International Search Report and Written Opinion for Aircraft Ground Power Connector.
WO2005/119877, Fuel Saving Engine Driven Aircraft Ground Power Device and Method of Use, Albrecht (Dec. 15, 2005).

(Continued)

*Primary Examiner* — Amy Cohen Johnson
*Assistant Examiner* — Milagros Jeancharles
(74) *Attorney, Agent, or Firm* — Law Offices of Eugene M. Cummings, P.C.

(57) ABSTRACT

An aircraft ground power connector for use in an aircraft ground power support system providing electrical power from a ground power unit through a ground power cable to the ground power receptacle of a parked aircraft. The axis of the portion of the connector housing which engages the aircraft ground power receptacle is angled relative to the axis of the portion of the housing which receives the ground power cable to minimize mechanical stress on the aircraft ground power receptacle when the connector is installed therein and to render the connector easier to insert and remove from the aircraft receptacle. Additionally, the ground power connector includes a capacitor connected to an electrical circuit within the connector supplying do voltage to the aircraft ground power receptacle to mitigate momentary voltage drops at the receptacle resulting from momentary surges in current demand by the aircraft.

11 Claims, 4 Drawing Sheets

(56) References Cited

U.S. PATENT DOCUMENTS

2013/0271075 A1* 10/2013 Restrepo et al. .............. 320/109
2014/0210399 A1* 7/2014 Urschel .................... H02J 1/00
　　　　　　　　　　　　　　　　　　　　　　　320/107

OTHER PUBLICATIONS

FR2891954, Raccord Coude Pour Cable Electrique Multifils, Ferragut (Apr. 13, 2007).
DE102012202368, Ladestecker, Rucker Andreas (Aug. 22, 2013).

* cited by examiner

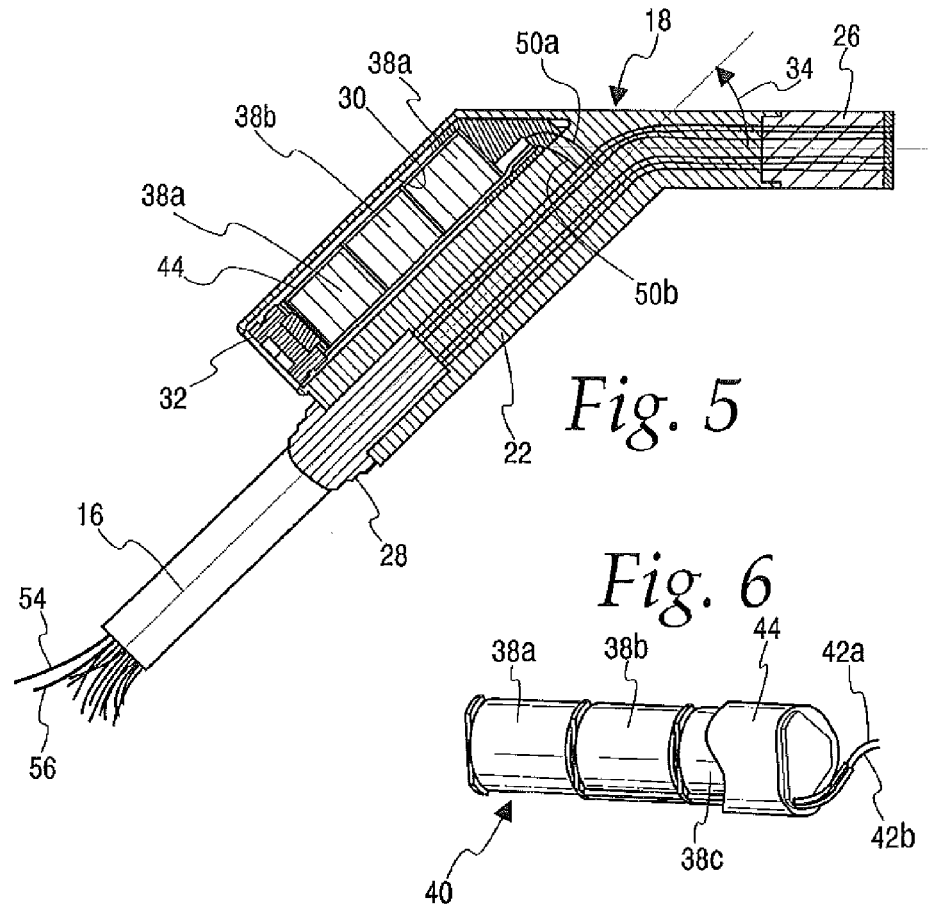
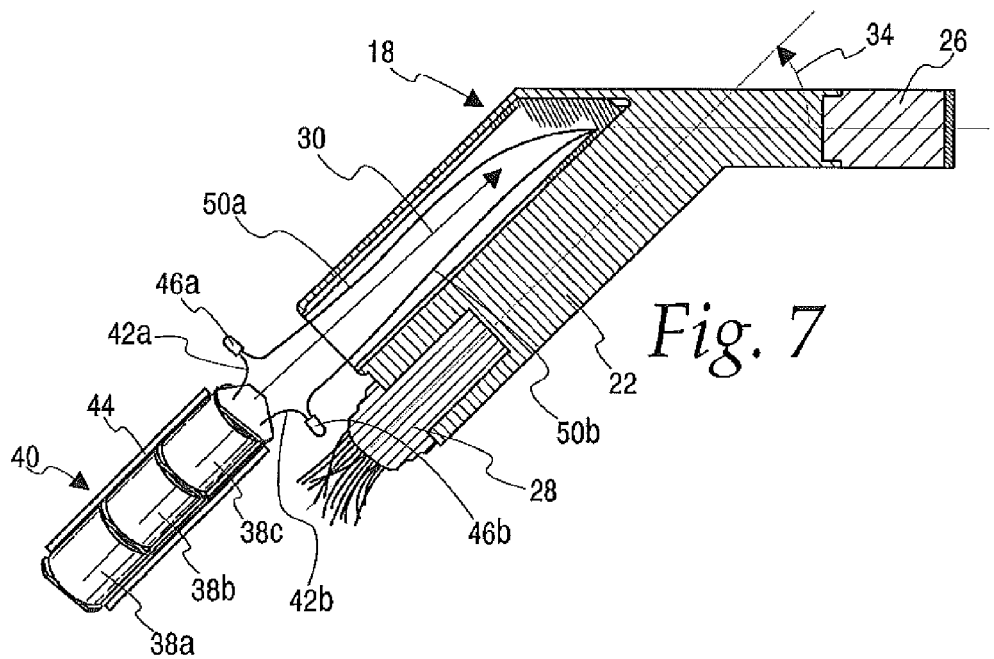

AIRCRAFT GROUND POWER CONNECTOR

CROSS-REFERENCE TO RELATED APPLICATION

None.

BACKGROUND OF THE INVENTION

I. Field of the Invention

The present disclosure relates generally to aircraft ground power support systems for supplying electrical power to parked aircraft, and more particularly, to a ground power connector for use in such systems which is angled to reduce side loads on the ground power receptacle and which includes a capacitor to mitigate momentary voltage variations at the receptacle resulting from momentary surges in current demand by the aircraft.

II. Description of the Prior Art

A ground power unit (GPU) is used to supply power to an aircraft while parked on the ground, such as during passenger loading and unloading, aircraft servicing, or other ground operations. The GPU is connected by a ground power cable to a ground power connector which mechanically and electrically connects to a ground power receptacle on the fuselage of the aircraft.

Because of the often non-planer surface of an aircraft fuselage, and various serviceability factors of internal aircraft systems, the axis of the ground power receptacle into which the connector is inserted is often neither horizontal nor vertical, and is instead situated at an angle relative to the horizontal. Conventional prior aircraft ground power connector designs have a housing which is aligned with both the axis of the power cable and the axis of the receptacle, and thus, unless the aircraft receptacle is directly facing the ground (e.g. at 90 degrees to the horizontal), undesirably cause the full weight of the unsupported length of power cable between the receptacle and the underlying ramp to be exerted as a side stress load on the receptacle.

Furthermore, the aircraft ground power receptacle may be in a location that is difficult for ground personnel to reach, such as at a shoulder high location with its axis angled above the horizontal. Prior ground power connector designs, having a single axis aligned with the axis of the cable and the axis of the receptacle, are particularly difficult to insert into and remove from such receptacles.

Furthermore, conventional ground power connector systems have no provision for mitigating momentary voltage drops at the aircraft ground power receptacle brought about by momentary surges in aircraft current demand. Such voltage drops may be detrimental to the proper functioning of aircraft systems, particularly during electrical systems testing, maintenance activities, or aircraft start procedures.

Accordingly, it is a general object of the present disclosure to provide an aircraft ground power connector that minimizes mechanical bending stress when installed in an aircraft ground power receptacle.

It is another general object of the present disclosure to provide an aircraft ground power connector which is easier to install in and remove from an aircraft ground power receptacle.

It is another general object of the present disclosure to provide an aircraft ground power connector that compensates for momentary voltage drops at the connector resulting from momentary surges in current demand by the aircraft.

It is a more specific object of the present disclosure to provide an aircraft ground power connector having a first housing portion having an axis aligned with the axis of the ground power cable, and a second housing portion having an axis aligned with the aircraft receptacle, wherein the axis of the two housing portions lie at a relative angle less than 90 degrees and greater than zero degrees.

It is another more specific object of the present disclosure to provide a ground power connector having a capacitor connected to electrical circuitry within the connector to compensate for momentary voltage drops in the circuitry resulting from momentary surges in current demand by the aircraft.

These and other objects, features and advantages of this disclosure will be more clearly understood through a consideration of the following detailed description.

SUMMARY OF THE INVENTION

According to an embodiment of the present disclosure, there is provided an aircraft ground power connector for use in a ground power support system connecting a ground power unit through a ground power cable to the ground power receptacle of a parked aircraft. The connector comprises a connector housing having a first housing portion adapted to engage the aircraft ground power receptacle, and a second housing portion adapted to securely receive the ground power cable, wherein the axis of the first housing portion forms an angle relative to the axis of the second housing portion to reduce bending stresses on the ground power receptacle when the connector is inserted therein.

In further accord with the disclosure, there is provided an aircraft ground power connector for use in an aircraft ground power support system connecting a ground power unit through a ground power cable to the ground power receptacle of a parked aircraft. The connector comprises a connector housing having a first housing portion adapted to engage the aircraft receptacle, and a second housing portion adapted to securely receive the power cable, wherein the connector housing further contains at least in part an electrical circuit for supplying power from the ground power unit through the ground power cable to the aircraft ground power receptacle, the electrical circuit providing a predetermined nominal voltage level at the ground power receptacle but being subject to momentary voltage drops resulting from momentary surges in current demand by the aircraft. The connector further comprises at least one capacitor which is electrically connected to said electrical circuit and is charged by current in the circuit to the predetermined nominal voltage level, the capacitor discharging into the electrical circuit upon the voltage at the ground power receptacle falling below the predetermined nominal voltage level to mitigate the voltage drop at the receptacle.

BRIEF DESCRIPTION OF THE DRAWINGS

The present disclosure will be more fully understood by reference to the following detailed description of one or more preferred embodiments when read in conjunction with the accompanying drawings, in which like reference characters refer to like parts throughout the views and in which:

FIG. 5 is a cross-sectional view of the ground power connector taken along lines 5-5 of FIG. 4, showing the provision of a capacitor module within the connector housing.

FIG. 6 is a perspective view of a capacitor module constructed for insertion into a compartment within the housing of the ground power connector of FIGS. 2-5.

FIG. 7 is a side elevational view, partially in cross-section, of the capacitor module of FIG. 6, showing the module positioned for insertion into the compartment in the ground power connector of FIG. 5.

DESCRIPTION OF THE PREFERRED EMBODIMENTS

The following description of the preferred embodiments is merely exemplary in nature and is in no way intended to limit the disclosure, its application or use.

Figure 1:
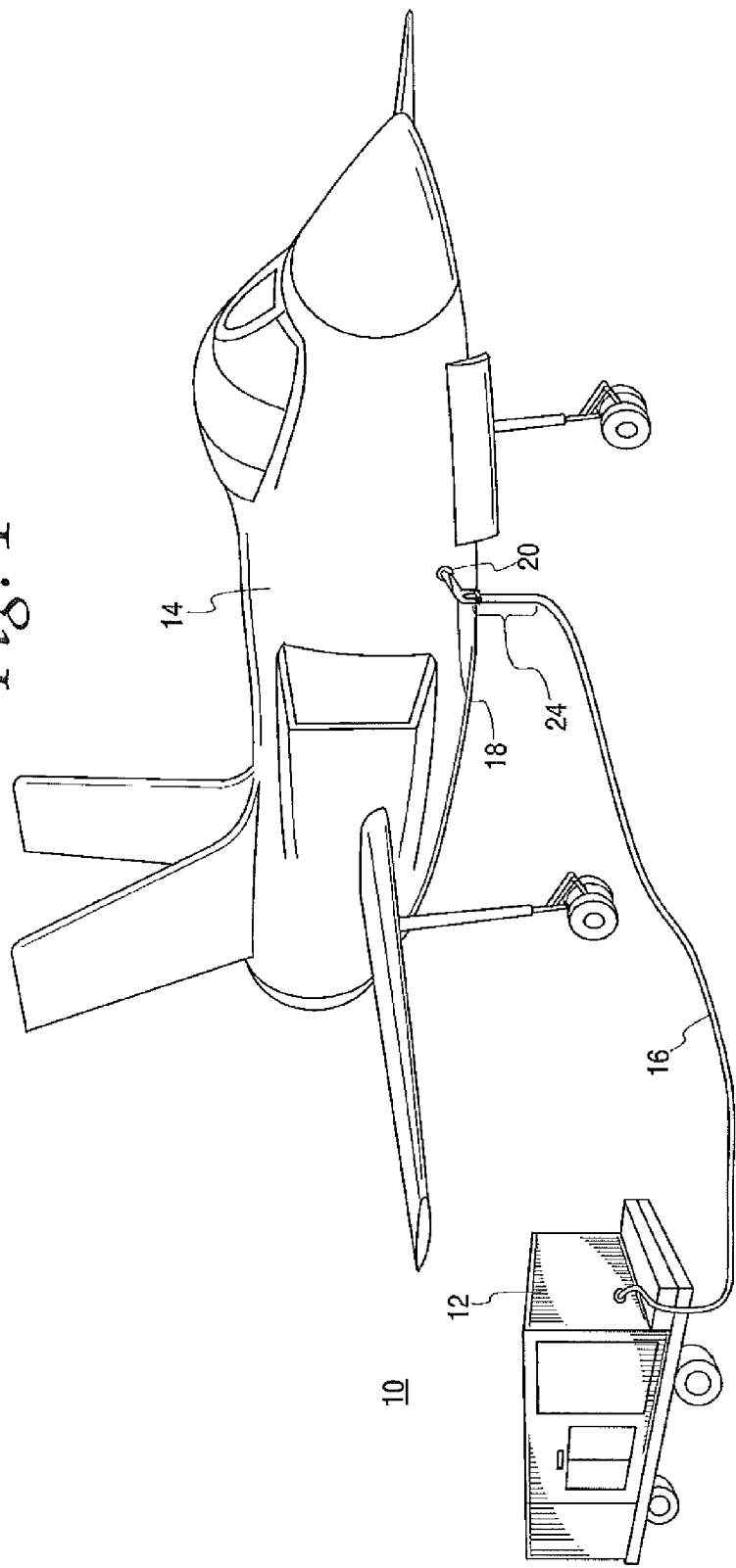
FIG. 1 is a perspective view of a parked aircraft having a ground power receptacle connected to a ground support cart by a ground power cable and a ground power connector wherein the axis of the portion of the connector connecting to the aircraft ground power receptacle is at an angle relative to the axis of the ground power cable and wherein a capacitor is provided at the connector to mitigate momentary voltage drops resulting from momentary surges in aircraft current demand.

Referring to the drawings, FIG. 1 illustrates an exemplary aircraft ground power support system 10 that provides electrical power from a ground power unit 12 to a parked aircraft 14, which may be a commercial, military or civilian aircraft. The illustrated ground power unit 12 is contained on a wheeled trailer and includes an onboard engine-driven generator which functions as a power supply, and which provides power to the aircraft 14 through a ground power cable 16 extending from the ground power unit to the aircraft. This ground power unit may be a mobile engine-driven unit, fixed engine-driven unit, mobile electric unit, fixed electric unit, or any combination of these. For example, a mobile unit that can be generated either by engine-driven means or electrically powered. The ground power cable is connected at one end to the ground power unit 12, and at the other end to the aircraft 14 by an aircraft ground power connector 18 which is mechanically and electrically received by a mating aircraft ground power receptacle 20.

Figure 2:
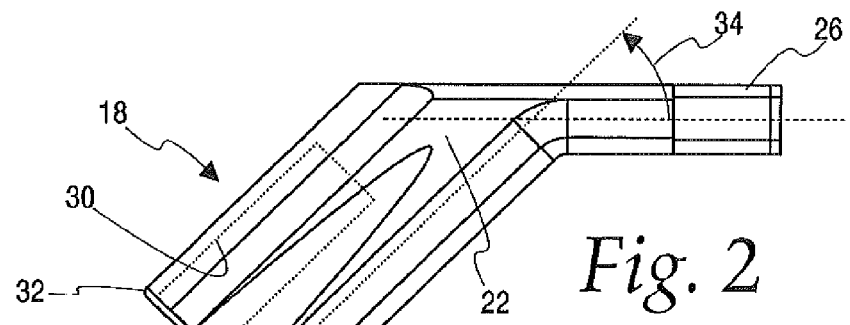
FIG. 2 is a side elevational view of the ground power connector shown in FIG. 1.

As shown in FIG. 2, the aircraft ground power connector 18 includes a connector housing 22 having a replaceable multiple-pin nose section 26 for insertion into the aircraft ground power receptacle 20, a strain relief sleeve 28 for securing ground power cable 16 to the connector housing, and a cylindrical compartment 30 having an access cap 32. The axis of a first portion of the connector housing 22 that engages the aircraft ground power receptacle 20 forms an angle 34 (FIGS. 2, 5 and 7) with the axis of a second portion of the connector housing that receives ground power cable 16 to reduce the side load of the hanging portion 24 (FIG. 1, between receptacle 20 and the underlying ramp surface) of the cable on receptacle 20. The relative angle 34 of the two connector housing portions also provides an ergonomic benefit of easier handling by ground personnel when installing the connector in or removing the connector from ground power receptacle 20, particularly when the receptacle is in an elevated location difficult to reach on the aircraft. In practice, it has been found that an angle 34 between 30 degrees and 60 degrees provides optimal ergonomic benefit.

Figure 3:
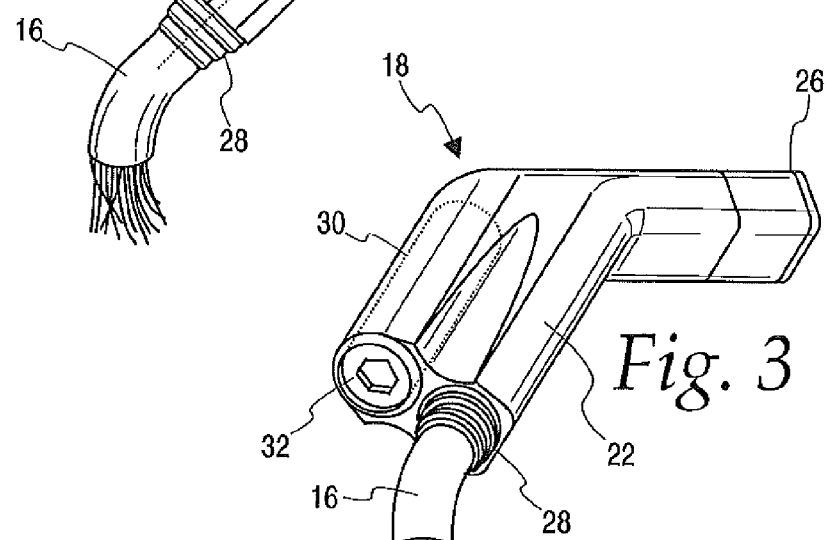
FIG. 3 is a rear perspective view of the ground power connector shown in FIG. 2.
Figure 4:
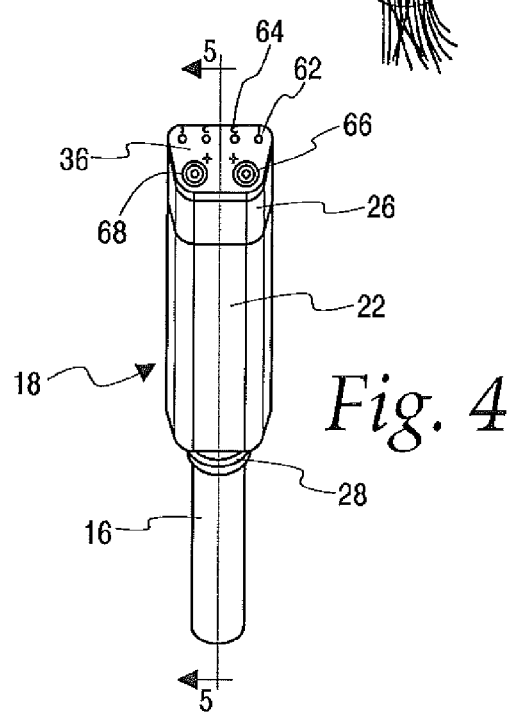
FIG. 4 is a bottom view of the ground power connector of FIG. 2.

FIGS. 3 and 4 illustrate ground power connector 18 in greater detail. The rear perspective view of FIG. 3 best illustrates the user-removable access cap 32 of cylindrical compartment 30. Access cap 32 may be threaded to engage complimentary threads on the inside surface of the exposed end of the compartment to seal the compartment shut, while allowing access to the interior of the compartment when necessary. The bottom perspective view of FIG. 4 best illustrates the multiple-pin connector interface 36 of the replaceable nose assembly 26 of ground power connector 18. While six pins are shown, it will be appreciated that a lesser or greater number of pins can be provided to satisfy individual connection requirements.

Ground power connector 18 also functions to condition power supplied to the aircraft by means of an integral capacitor. More particularly, in the illustrated embodiment of the disclosure, as shown in FIGS. 5-7, the capacitor 38 is provided in the form of three parallel-connected capacities contained 38a, 38b and 38c within a capacitor module 40 which is contained within compartment 30. In the present embodiment capacitor module 40 contains three 22000 uF capacitors 38a, 38b and 38c, electrically connected in parallel to conductors 42a and 42b and physically arranged end-to-end within a thin-walled cylindrical non-conductive sleeve 44 (FIG. 6).

Figure 8:
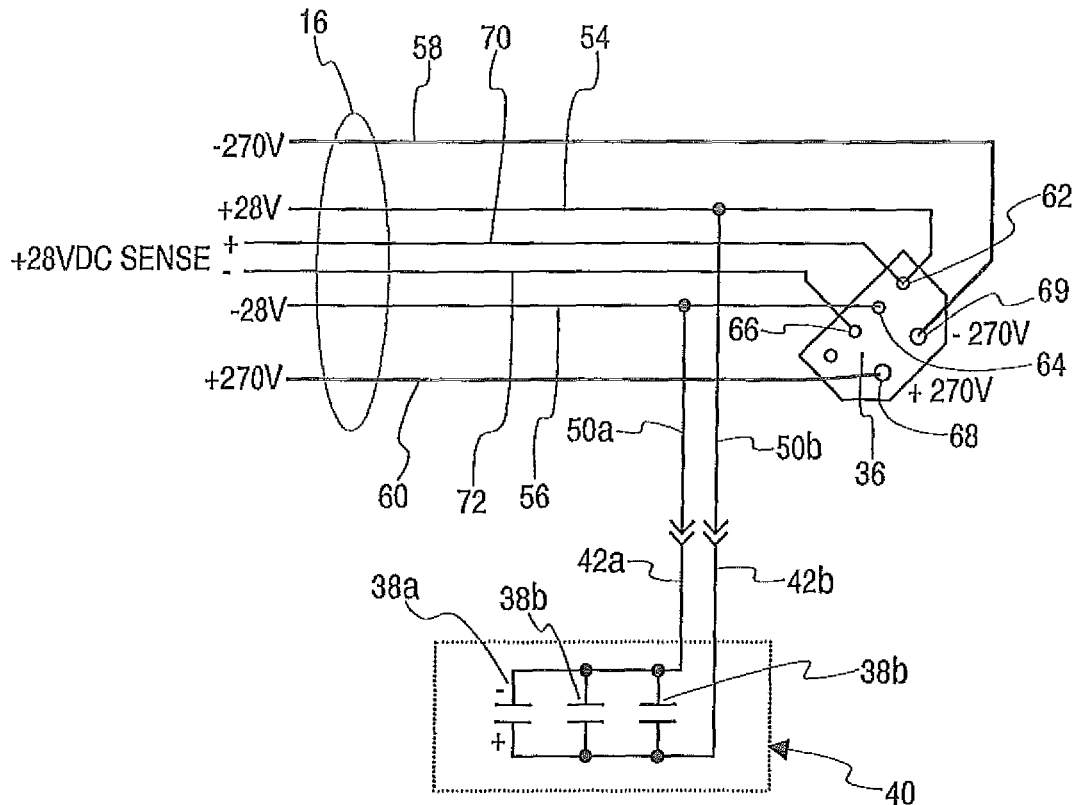
FIG. 8 is a simplified schematic diagram of certain electrical connections contained within the housing of the ground power connector of FIGS. 2, 3, 4, 5 and 7.

As shown in FIGS. 7 and 8, capacitor module 40 is inserted into compartment 30, and conductors 42a and 42b are connected by connectors 46a and 46b to interconnecting conductors 50a and 50b, respectively. Conductors 50a and 50b in turn connect to conductors 54 and 56 (FIG. 8), respectively, of a 28 VDC electrical circuit within housing 22. Conductors 54 and 56 extend within housing 22 between power cable 16 and pins 62 and 64 of connector interface 36.

Referring now to FIG. 8, ground power connector 18 is seen to accommodate a 270 volt DC electrical circuit by way of conductors 58 and 60 and a 28-volt DC circuit by way of conductors 54 and 56. The two circuits are supplied from ground power unit 12 through ground power cable 16. Conductors 58 and 60 are connected to pins 69 and 68, respectively, in the connector interface 36 of connector 18. For safety purposes, a pair of non-load carrying voltage sensing conductors 70 and 72 extend from pins 62 and 66 through ground power cable 16 to ground power unit 12 to signal the ground power unit that ground power connector 18 is engaged with ground power receptacle 20 and the 270 VDC circuit can be safely activated.

In operation, 270-volt DC primary power is supplied to the aircraft through conductors 58 and 60. Simultaneously, 28-volt DC power is supplied by conductors 54 and 56 for control purposes. In this representative embodiment of the disclosure, it is desired that this 28-VDC supply at pins 62 and 64 be maintained at a predetermined 28 VDC nominal voltage level.

To this end, and in accordance with another aspect of the disclosure, capacitor module 40 is connected across conductors 54 and 56 to mitigate any momentary voltage drop appearing at pins 62 and 64 with momentary surges in current demand by the aircraft. Capacitor module 40 charges during normal operation to the 28-volt nominal voltage level of the control circuit. When the voltage on conductors 54 and 56 falls, the three parallel-connected capacitors 38a, 38b and 38c of module 40 discharge into the 28-volt circuit and act to maintain the 28 VDC nominal voltage level at pins 62 and 64. This is desirable to preclude the possibility of malfunction of control circuits within the aircraft resulting from a momentary voltage drop on the 28-volt control circuit.

Figure 9:
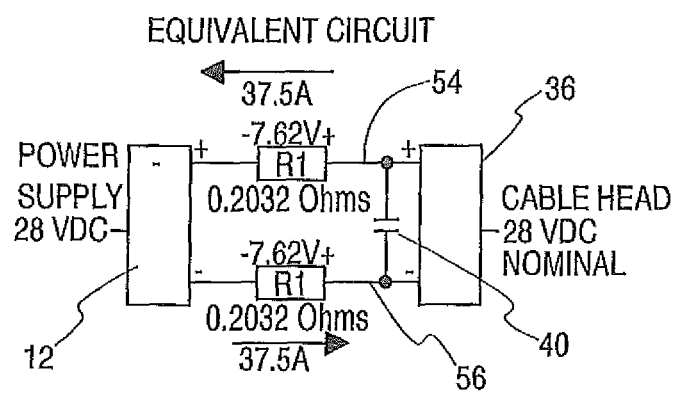
FIG. 9 is a simplified block diagram partially in schematic form depicting the equivalent electrical circuit of a portion of the ground power support system of FIG. 1.

As shown by the simplified equivalent circuit of FIG. 9, in an exemplary system, the conductors 54 and 56 of the 28-volt circuit may each be formed by two strands of no. 14 wire extending the length of ground power cable 16 and in so doing each provide an effective series resistance of 0.2032 ohms. For a 37.5 amp representative peak surge current (lasting up to 250 ms), a voltage drop of 7.62 volts occurs in each conductor, for a total voltage drop in the 28 VDC electrical circuit of 15.24 volts. Capacitor module 40 acts to mitigate this momentary voltage drop by immediately discharging through conductors 50a and 50b into the 28 VDC circuit provided by conductors 54 and 56.

In practice, the three capacitors 38a, 38b and 38c provided in capacitor module 40 are each 22,000 microfarads and are parallel-connected to provide a total capacitance of 66,000 microfarads to maintain the 28-volt nominal voltage on the control circuit. It will be appreciated that in other applications a greater or lesser capacitance value may be required, and that the capacitor module may take other forms and may include a greater or lesser number of individual capacitors of different capacitance values.

The foregoing detailed description has been given for clearness of understanding only and no unnecessary limitations should be understood therefrom. Accordingly, while one or more particular embodiments of the disclosure have been shown and described, it will be apparent to those skilled in the art that changes and modifications may be made therein without departing from the invention if its broader aspects, and, therefore, the aim in the appended claims is to cover all such changes and modifications as fall within the true spirit and scope of the present disclosure.

We claim:

1. An aircraft ground power connector for use in an aircraft ground power support system connecting a ground power unit through a ground power cable to the ground power receptacle of a parked aircraft, comprising:

a connector housing having a first portion adapted to engage the aircraft ground power receptacle, and a second portion adapted to securely receive the ground power cable;

one or more voltage sensors within said housing;

said connector housing further containing at least two electrical conductors forming in part an electrical circuit for supplying power from said ground power unit through said ground power cable to said aircraft ground power receptacle, said electrical circuit providing a predetermined nominal voltage level at said ground power receptacle but being subject to a momentary voltage drop, detected by said sensor, resulting from a momentary surge in current demand by the aircraft;

a capacitor for conditioning power supplied to said aircraft, said capacitor disposed within said connector housing and electrically connected to said electrical circuit and charged by current in the circuit during normal operation to said predetermined nominal voltage; and said capacitor discharging into said electrical circuit upon the voltage at said ground power receptacle falling below said predetermined nominal voltage level to mitigate said voltage drop at the receptacle.

2. An aircraft ground power connector as defined in claim 1 wherein the axis of said first housing portion forms an angle relative to the axis of said second housing portion to reduce bending stress on the receptacle when the connector is inserted therein.

3. An aircraft ground power connector as defined in claim 2 wherein said axis of said first connector portion forms an angle greater than zero degrees but less than ninety degrees relative to said axis of said second connected portion.

4. An aircraft ground power connector as defined in claim 3 wherein said axis of said first connector portion forms an angle between 30 degrees and 60 degrees relative to said axis of said second connector portion.

5. An aircraft ground power connector as defined in claim 1 wherein said capacitor is contained within a capacitor module having multiple individual capacitors electrically connected in parallel.

6. An aircraft ground power connector as defined in claim 1 wherein said capacitor module is contained within an electrically non-conductive housing and includes at least two electrical conductors connected to said electrical circuit within said housing.

7. An aircraft ground power connector as defined in claim 6, wherein said connector housing includes a compartment dimensioned to receive said capacitor module.

8. An aircraft ground power connector as defined in claim 6 wherein said capacitor module and said compartment are cylindrical in form.

9. An aircraft ground power connector as defined in claim 7 wherein said compartment is accessible from the exterior of said housing and said capacitor module is removable from said compartment for test or replacement.

10. An aircraft ground power connector as defined in claim 9 wherein said connector housing includes a removable cap adapted to fit over said compartment to secure said capacitor module in said compartment.

11. An aircraft ground power connector as defined in claim 1 wherein said nominal voltage is approximately 28 VDC and said capacitor element is approximately 66000 microfarads.

* * * * *